(12) United States Patent
Wu et al.

(10) Patent No.: US 8,762,774 B2
(45) Date of Patent: Jun. 24, 2014

(54) DISTRIBUTED BLADE SERVER SYSTEM, MANAGEMENT SERVER AND SWITCHING METHOD

(75) Inventors: Zhaohui Wu, Shenzhen (CN); Youyu Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 13/340,055

(22) Filed: Dec. 29, 2011

(65) Prior Publication Data
US 2012/0137165 A1    May 31, 2012

Related U.S. Application Data

(63) Continuation of application No. PCT/CN2011/075368, filed on Jun. 7, 2011.

(30) Foreign Application Priority Data

Nov. 30, 2010    (CN) .......................... 2010 1 0565746

(51) Int. Cl.
*G06F 11/00*    (2006.01)

(52) U.S. Cl.
USPC ............................................. 714/13; 714/11

(58) Field of Classification Search
USPC .............................. 714/11–13, 4.1, 4.11, 4.12
See application file for complete search history.

(56) References Cited

U.S. PATENT DOCUMENTS

| 7,376,859 | B2 | 5/2008 | Boyd et al. |
| 7,472,308 | B2 * | 12/2008 | Takuwa et al. ................. 714/13 |
| 2007/0055853 | A1 * | 3/2007 | Hatasaki et al. ................. 713/1 |
| 2007/0214387 | A1 * | 9/2007 | Nakajima et al. ............... 714/13 |
| 2008/0028107 | A1 * | 1/2008 | Cherian et al. .................... 710/9 |
| 2008/0133963 | A1 * | 6/2008 | Katano et al. ..................... 714/4 |
| 2009/0077370 | A1 | 3/2009 | Barabash et al. |
| 2009/0282135 | A1 | 11/2009 | Ravindran et al. |
| 2009/0282142 | A1 | 11/2009 | Tamura et al. |

FOREIGN PATENT DOCUMENTS

| CN | 1983975 | A | 6/2007 |
| CN | 101000572 | A | 7/2007 |
| CN | 101141762 | A | 3/2008 |
| CN | 201122978 | Y | 9/2008 |
| CN | 101345631 | A | 1/2009 |
| CN | 101996111 | A | 3/2011 |

OTHER PUBLICATIONS

Rejection Decision in corresponding Chinese Patent Application No. 201010565746.9 (Nov. 5, 2012).
Office Action in corresponding Chinese Patent Application No. 201010565746.9 (Mar. 22, 2012).
International Search Report in corresponding PCT Application No. PCT/CN2011/075368 (Aug. 25, 2011).

* cited by examiner

*Primary Examiner* — Dieu-Minh Le
(74) *Attorney, Agent, or Firm* — Leydig, Voit & Mayer, Ltd.

(57) ABSTRACT

A distributed blade server system, a management server and a switching method are provided. The method includes: determining a standby blade of a first blade when it is determined that the first blade is in abnormal operation; delivering, based on an access relationship between a startup card of the first blade and a first storage partition, a first configuration command to a storage system, the first configuration command including information of an access relationship between a startup card of the standby blade and the first storage partition, so that the storage system configures the access relationship between the startup card of the standby blade and the first storage partition; and delivering a startup command to the standby blade.

13 Claims, 9 Drawing Sheets

US 8,762,774 B2

DISTRIBUTED BLADE SERVER SYSTEM, MANAGEMENT SERVER AND SWITCHING METHOD

CROSS-REFERENCE TO RELATED APPLICATIONS

This application is a continuation of International Application No. PCT/CN2011/075368, filed on Jun. 7, 2011, which claims priority to Chinese Patent Application No. 201010565746.9, filed on Nov. 30, 2010, both of which are hereby incorporated by reference in their entireties.

FIELD OF THE INVENTION

The present invention relates to the field of communications technologies, and in particular, to a distributed blade server system, a management server and a switching method.

BACKGROUND OF THE INVENTION

A blade server subsystem is characterized by high computing capability, space saving, centralized management and being easy to extend. Compared with a conventional rack system and a tower server system, the blade server subsystem may help enterprises to reduce the costs of power supply, heat dissipation and storage space, and as a result, a blade server has been used due to advantages with respect to cost efficiency.

The blade server subsystem includes a large number of hot-swappable devices, referred to as blades, accommodated in a chassis. The blade mentioned here is an independent server, and the blade includes one or more processors and related memories, storage disks and network controllers, and runs its own operating system (OS) and application program. The blade server subsystem shares common infrastructure components, such as power sources, fans, Compact Disk Read-Only Memories (CD-ROMs) and floppy disk drives, Ethernet and Fibre Channel (FC) switches and system ports, and thereby the complexity of many rack systems is avoided. The most significant difference lies in that the blade server subsystem is installed on a horizontal bottom plate in a perpendicular manner, while a typical rack system is formed by horizontal arrangement of vertically stacked servers.

In the implementation of the present invention, the inventor finds that though the blade server subsystem requires low power consumption, the density of blades is high, and in a high-density deployment environment, the reliability of blades is lower than that of tower and rack servers, and spare blades may not be replaced quickly; and in a distributed system, the reliability of nodes deployed on the blade server is lower than that of nodes deployed on a minicomputer, as a result, a system reliability is low.

SUMMARY OF THE INVENTION

Embodiments of the present invention provide a distributed blade server system, a management server and a switching method, so as to improve the system reliability.

In one aspect, an embodiment of the present invention provides a distributed blade server system, which includes a management server, a storage system, and a blade server subsystem including multiple blades, the management server being in communication connection with the blade server subsystem and the storage system through a network, where
the management server is configured to determine a standby blade of a first blade when it is determined that the first blade is in abnormal operation; deliver, based on an access relationship between a startup card of the first blade and a first storage partition, a first configuration command to the storage system, the first configuration command including information of an access relationship between a startup card of the determined standby blade and the first storage partition; and deliver a startup command to the determined standby blade;
the storage system includes multiple storage partitions, and saves an OS, an application program and configuration data that are required by the multiple blades; and is configured to respond to the first configuration command to configure the access relationship between the startup card of the standby blade and the first storage partition, so as to enable the standby blade to access the first storage partition; and
the standby blade is configured to respond to the startup command, and after the startup card of the standby blade is started, load, from the accessible first storage partition in the storage system, the OS, the application program and the configuration data.

In another aspect, an embodiment of the present invention provides a management server, which includes:
a data storage module, configured to save system configuration data, where the system configuration data includes one or more parameters in a mapping relationship between a blade startup card identification, a storage system partition identification, and a blade state; and
a device management module, configured to determine a standby blade of a first blade when it is determined that the first blade is in abnormal operation; deliver, based on an access relationship between a startup card of the first blade and a first storage partition, a first configuration command to a storage system, the first configuration command including information of an access relationship between a startup card of the determined standby blade and the first storage partition; and deliver a startup command to the determined standby blade.

In another aspect, an embodiment of the present invention provides a switching method, which is applicable to a management server, and includes:
determining a standby blade of a first blade when it is determined that the first blade is in abnormal operation;
delivering, based on an access relationship between a startup card of the first blade and a first storage partition, a first configuration command to a storage system, the first configuration command including information of an access relationship between a startup card of the standby blade and the first storage partition, so that the storage system configures the access relationship between the startup card of the standby blade and the first storage partition; and
delivering a startup command to the standby blade, so that the standby blade responds to the startup command, and after the startup card of the standby blade is started, loads, from the accessible first storage partition in the storage system, an OS, an application program and configuration data.

In another aspect, an embodiment of the present invention provides a distributed blade server system, which includes a management server, a storage system, and a blade server subsystem including multiple blades, the management server being in communication connection with the blade server subsystem and the storage system through a network, where
the management server is configured to determine a standby blade of a first blade when it is determined that the first blade is in abnormal operation, deliver a first configuration command to the storage system, the first configuration command being used for indicating that the determined standby blade is capable of accessing a first storage partition where original loaded content of the first blade is located, and deliver a startup command to the determined standby blade;

the storage system includes multiple storage partitions, and saves an OS, an application program and configuration data that are required by the multiple blades; and is configured to respond to the first configuration command to configure an access relationship between the standby blade and the first storage partition where the original loaded content of the first blade is located, so as to enable the standby blade to access the first storage partition; and the standby blade is configured to start in response to the startup command, and load, from the accessible first storage partition in the storage system, the OS, the application program and the configuration data.

It may be seen that, in the embodiments of the present invention, a management server is deployed in a distributed blade server system with blades that do not have a local disk, and the management server determines a standby blade of a first blade when finding that the first blade is in abnormal operation; delivers, based on an access relationship between a startup card of the first blade and a first storage partition, a first configuration command to the storage system, so that the storage system responds to the first configuration command to configure an access relationship between a startup card of the standby blade and the first storage partition, so as to enable the standby blade to access the first storage partition, thereby configuring an access relationship between the blades and the storage partitions in the storage system through the management server; and delivers a startup command to the determined standby blade, so that the standby blade responds to the startup command, and after the startup card of the standby blade is started, loads, from the accessible first storage partition in the storage system, the OS, the application program and the configuration data, so that blade switching is controlled through the management server. In this way, when a fault occurs in a blade, a standby blade may be quickly used for providing a service, so as to reduce the service interruption time, and thereby the system reliability is improved.

BRIEF DESCRIPTION OF THE DRAWINGS

To make the technical solutions of the present invention or the prior art more comprehensible, the accompanying drawings required to be used in the description of the embodiments or the prior art are simply described below. Apparently, the accompanying drawings described below demonstrate some of the embodiments of the present invention. Based on the accompanying drawings, persons skilled in the art may obtain other accompanying drawings without creative efforts.

FIG. 4b is a schematic architectural diagram of an application networking environment of the management server participating in the blade switching process according to the embodiment of the present invention shown in FIG. 4a;

FIG. 5b is a schematic architectural diagram of an application networking environment of the management server participating in the disk array switching process according to the embodiment of the present invention shown in FIG. 5a;

DETAILED DESCRIPTION OF THE EMBODIMENTS

In order to make the objectives, technical solutions, and advantages of the present invention clearer, the technical solutions of the present invention are clearly described below through specific embodiments with the accompanying drawings. It is obvious that the embodiments to be described are a part rather than all of the embodiments of the present invention. All other embodiments obtained by persons skilled in the art based on the embodiments of the present invention without creative effects shall fall within the protection scope of the present invention.

Figure 1:
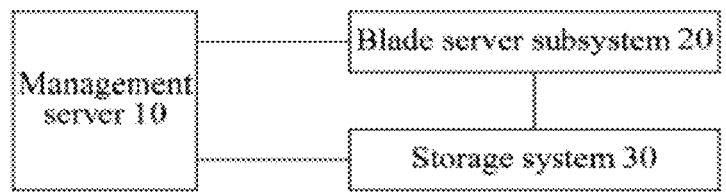
FIG. 1 is a schematic diagram of a logical structure of a distributed blade server system according to an embodiment of the present invention.
Figure 1A:
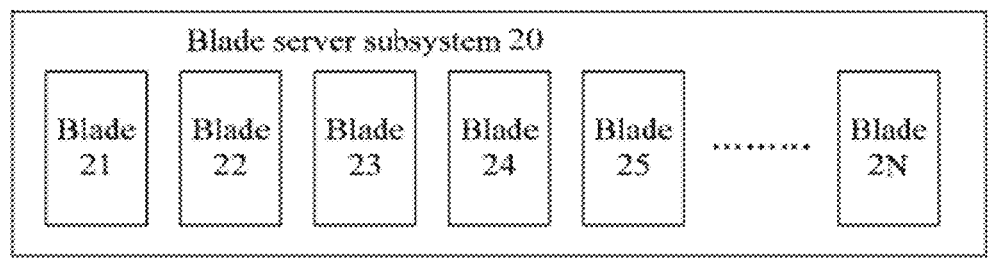
FIG. 1a is a schematic structural diagram of a blade server subsystem 20 in FIG. 1.

FIG. 1 is a schematic diagram of a logical structure of a distributed blade server system according to an embodiment of the present invention. As shown in FIG. 1, the distributed blade server system according to the embodiment of the present invention includes: a management server 10, a storage system 30, and a blade server subsystem 20 (as shown in FIG. 1a) including multiple blades 21, 22, . . . , and 2N, and the management server 10 is in communication connection with the blade server subsystem 20 and the storage system 30 through a network.

The management server 10 is configured to determine a standby blade of a first blade when it is determined/found that the first blade is in abnormal operation; deliver, based on an access relationship between a startup card of the first blade and a first storage partition, a first configuration command to the storage system 30, the first configuration command including information of an access relationship between a startup card of the determined standby blade and the first storage partition; and deliver a startup command to the determined standby blade.

The storage system 30 includes multiple storage partitions, and is adapted to save an OS, an application program and configuration data that are required by the blades 21, 22, . . . , and 2N; and is adapted to respond to the first configuration command to configure the access relationship between the startup card of the standby blade and the first storage partition, so as to enable the standby blade to access the first storage partition.

The standby blade is configured to respond to the startup command, and after the startup card of the standby blade is started, load, from the accessible first storage partition in the storage system, the OS, the application program and the configuration data.

In one implementation scheme, the management server 10 is specifically configured to save system configuration data, the system configuration data including a blade startup card identification, a storage partition identification, and a blade state (including an active state, a standby state, and a faulty state) that have a mapping relationship, and optionally further including a blade type; and configured to monitor an operating state of a blade, where the operating state includes one or more combinations of a state of a network card of the blade, a heartbeat of the blade, and a state of an application program on the blade, and determine a standby blade of a first blade when detecting that the first blade is in abnormal operation; deliver a first configuration command to the storage system 30 based on a mapping relationship between a startup card identification of the first blade and a first storage partition identification, the first configuration command including information of a mapping relationship between a startup card identification of the determined standby blade and the first storage partition identification; and deliver a startup command to the determined standby blade.

Correspondingly, the storage system 30 is specifically adapted to respond to the first configuration command to configure the mapping relationship between the startup card identification of the standby blade and the first storage partition identification.

Correspondingly, the standby blade is specifically configured to respond to the startup command, and after the startup card of the standby blade is started, load the OS, the application program and the configuration data from a first storage partition identified by the first storage partition identification associated with the startup card identification of the standby blade.

In another implementation scheme, the management server 10 is specifically configured to save system configuration data, the system configuration data including a blade startup card identification, a storage partition identification, and a blade state (including an active state, a standby state, and a faulty state) that have a mapping relationship, and optionally further including a blade type; and configured to monitor a fault alarm reported from a blade, and determine a standby blade of a first blade when receiving a fault alarm reported from the first blade; deliver a first configuration command to the storage system 30 based on a mapping relationship between a startup card identification of the first blade and a first storage partition identification, the first configuration command including information of a mapping relationship between a startup card identification of the determined standby blade and the first storage partition identification; and deliver a startup command to the determined standby blade.

Correspondingly, the storage system 30 is specifically adapted to respond to the first configuration command to configure the mapping relationship between the startup card identification of the standby blade and the first storage partition identification.

Correspondingly, the standby blade is specifically configured to respond to the startup command, and after the startup card of the standby blade is started, load the OS, the application program and the configuration data from a first storage partition identified by the first storage partition identification associated with the startup card identification of the standby blade.

It should be noted that, the standby blade of the first blade is identified by any one of the following: a blade startup card identification with a blade state being a standby state, or a blade startup card identification that matches a blade type of the startup card identification of the first blade and that is with a blade state being a standby state, or a standby blade startup card identification obtained through a man-machine interface.

If the system configuration data further includes the blade type, the startup card identification of the determined standby blade may be: a blade startup card identification that matches a blade type of the startup card identification of the first blade and that is with a blade state being a standby state.

If it does not need to distinguish the blade type of the multiple blades 21, 22, . . . , and 2N in the distributed blade server system according to the embodiment of the present invention, the startup card identification of the determined standby blade may be: a blade startup card identification with a blade state being a standby state.

Figure 1B:
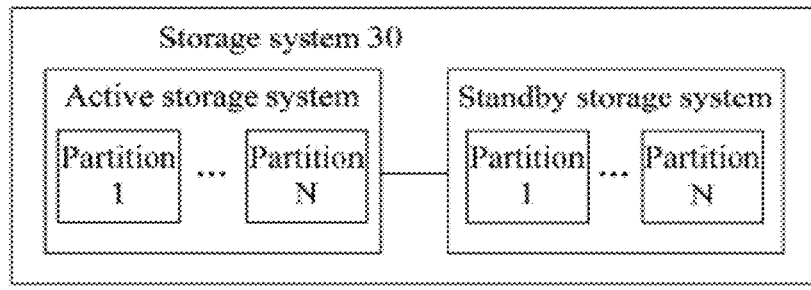
FIG. 1b is a schematic structural diagram of a storage system 30 in FIG. 1.

Preferably, as shown in FIG. 1*b*, in the distributed blade server system according to the embodiment of the present invention, the storage system 30 includes an active storage system 31 and a standby storage system 32, and each storage system includes multiple storage partitions 1, 2, . . . , and N.

Correspondingly, the management server 10 is further configured to remove an access relationship between the blade 21, 22, . . . , and 2N and a corresponding storage partition in the active storage system 31 when it is found that the active storage system 31 is in abnormal operation, deliver a second configuration command to the standby storage system 32 based on an access relationship between a startup card of the blade 21, 22, . . . , and 2N and the corresponding storage partition in the active storage system, the second configuration command including information of an access relationship between the startup card of the blade 21, 22, . . . , and 2N and a corresponding storage partition in the standby storage system, and is configured to deliver a restart command to the blade 21, 22, . . . , and 2N.

Correspondingly, the standby storage system 32 is further configured to respond to the second configuration command to configure the access relationship between the startup card of the blade 21, 22, . . . , and 2N and the corresponding storage partition in the standby storage system.

Correspondingly, the blade 21, 22, . . . , and 2N is further configured to respond to the restart command, and after the startup card of the blade 21, 22, . . . , and 2N is started, load the OS, the application program and the configuration data from the accessible storage partition in the standby storage system 32.

In one implementation scheme, the management server 10 is further configured to monitor a state of the storage system, where the state includes one or more combinations of a heartbeat of the storage system and a state of the storage system, remove a mapping relationship between a blade 21, 22, . . . , and 2N and the active storage system when detecting that the active storage system is in abnormal operation, deliver a second configuration command to the standby storage system based on a mapping relationship between a startup card identification of the blade and a corresponding storage partition identification in the active storage system, the second configuration command including information of a mapping relationship between the startup card identification of the blade and a corresponding storage partition identification in the standby storage system, and is configured to deliver a restart command to the blade 21, 22, . . . , and 2N.

Correspondingly, the standby storage system is further configured to respond to the second configuration command to configure the mapping relationship between the startup card identification of the blade 21, 22, . . . , and 2N and the corresponding storage partition identification in the standby storage system.

Correspondingly, the blade 21, 22, . . . , and 2N is further configured to respond to the restart command, and after the startup card of the blade 21, 22, . . . , and 2N is started, load the OS, the application program and the configuration data from a storage partition in the standby storage system identified by the storage partition identification associated with the startup card identification of the blade.

In another implementation scheme, the management server 10 is further configured to monitor a fault alarm reported from the storage system, remove a mapping relationship between a blade 21, 22, . . . , and 2N and the active storage system when receiving a fault alarm reported from the active storage system, deliver a second configuration command to the standby storage system based on a mapping relationship between a startup card identification of the blade and a corresponding storage partition identification in the active storage system, the second configuration command including information of a mapping relationship between the startup card identification of the blade and a corresponding storage partition identification in the standby storage system, and deliver a restart command to the blade 21, 22, . . . , and 2N.

Correspondingly, the standby storage system is further configured to respond to the second configuration command to configure the mapping relationship between the startup card identification of the blade 21, 22, . . . , and 2N and the corresponding storage partition identification in the standby storage system.

Correspondingly, the blade 21, 22, . . . , and 2N is further configured to respond to the restart command, and after the startup card of the blade 21, 22, . . . , and 2N is started, load the OS, the application program and the configuration data from a storage partition in the standby storage system identified by the storage partition identification associated with the startup card identification of the blade.

It should be noted that, the restart command may be delivered to all blades, or blades in an active state.

Figure 1C:
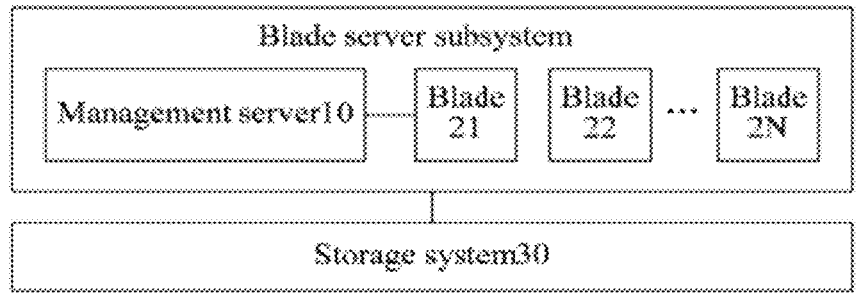
FIG. 1c is a schematic diagram of physical deployment of a distributed blade server system according to an embodiment of the present invention.

In the distributed blade server system according to the embodiment of the present invention, the management server 10 may be deployed in different manners, for example, the management server 10 is deployed on an independent server, or, as shown in FIG. 1c, deployed on a blade in the blade server subsystem.

It should be noted that, the startup card of the blade involved in the embodiment of the present invention is a Host Bus Adaptor (HBA), and the HBA includes, but is not limited to, a Fibre Channel HBA (FC-HBA), an Internet Small Computer Systems Interface HBA (iSCSI-HBA), and an Ethernet HBA. Each blade has an HBA or is deployed with an HBA.

Correspondingly, the blade startup card identification actually refers to an identification, World Wide Name (WWN), of a port of the HBA on the blade, in which the WWN is a unique name in the world and is generally a unique 48 or 64 bit number assigned by a recognized naming authority (often via block assignment to a manufacturer). It should be understood that, one blade generally has two or more ports, and the WWN is classified into two types, namely, node WWN (WWNN) and port WWN (WWPN), in which all ports on the same HBA share one WWNN, and each port on the HBA has a unique WWPN.

The storage partition identification in the embodiment of the present invention refers to information that can be used for uniquely identifying or distinguishing different storage partitions in the storage system.

Based on the above, in the embodiment of the present invention, a management server is deployed in a distributed blade server system with blades that do not have a local disk, and the management server determines a standby blade of a first blade when finding that the first blade is in abnormal operation; delivers, based on an access relationship between a startup card of the first blade and a first storage partition, a first configuration command to the storage system, so that the storage system responds to the first configuration command to configure an access relationship between a startup card of the standby blade and the first storage partition, so as to enable the standby blade to access the first storage partition, thereby configuring an access relationship between the blades and the storage partitions in the storage system through the management server; and delivers a startup command to the determined standby blade, so that the standby blade responds to the startup command, and after the startup card of the standby blade is started, loads, from the accessible first storage partition in the storage system, the OS, the application program and the configuration data, so that blade switching is controlled through the management server. In this way, when a fault occurs in a blade, a standby blade may be quickly used for providing a service, so as to reduce the service interruption time, and thereby the system reliability is improved.

Further, when finding that the active storage system is in abnormal operation, the management server delivers a second configuration command to the standby storage system based on an access relationship between a startup card of the blade and the corresponding storage partition in the active storage system, so that the standby storage system responds to the second configuration command to configure an access relationship between the startup card of the blade and a corresponding storage partition in the standby storage system, so as to enable the blade to access the corresponding storage partition, thereby configuring an access relationship between the blades and the storage partitions in the standby storage system through the management server; and delivers a restart command to the blade, so that the blade responds to the restart command, and after the startup card of the standby blade is started, loads the OS, the application program and the configuration data from the accessible storage partition in the standby storage system, thereby storage system switching is controlled through the management server. In this way, when a fault occurs in a storage system, a standby storage system may be quickly used for providing a service, so as to reduce the service interruption time, and thereby the system reliability is further improved.

Figure 1D:
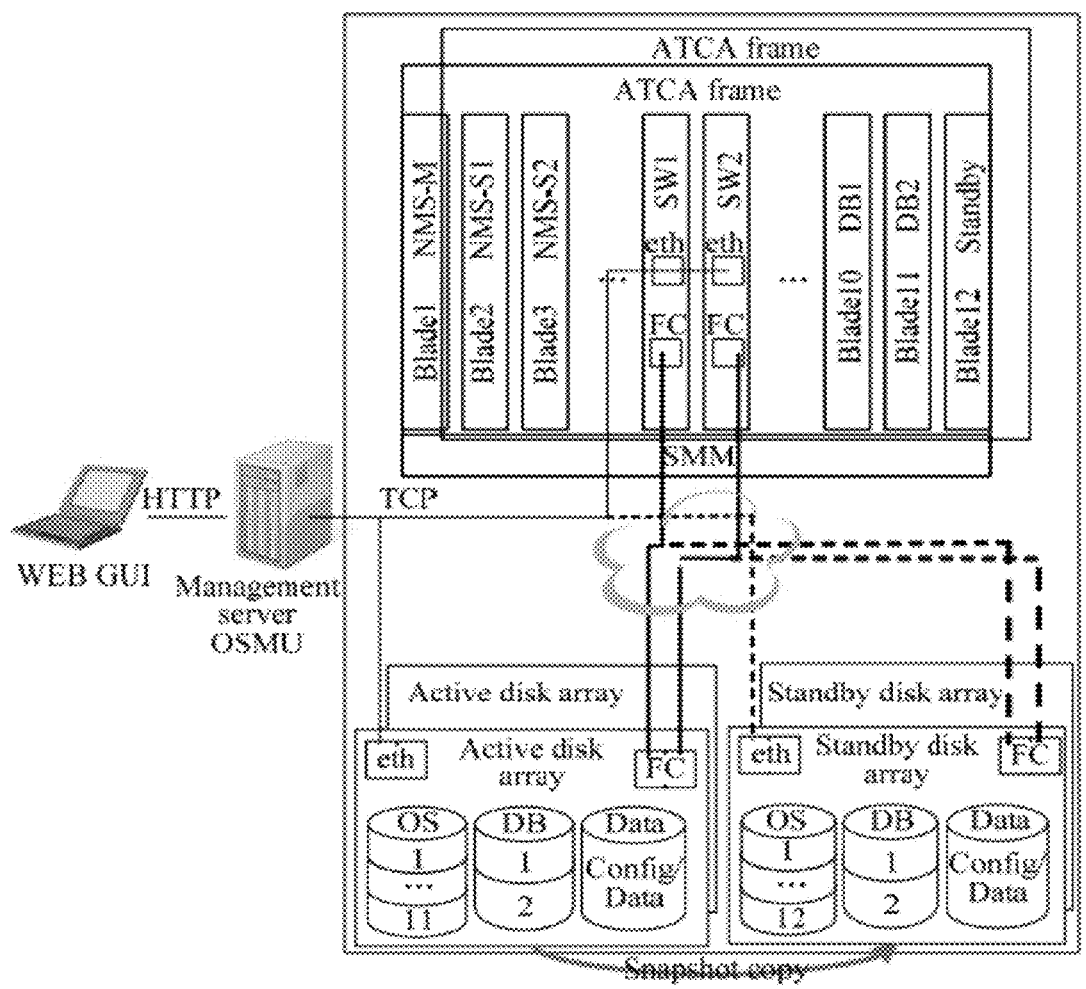
FIG. 1d is a schematic diagram of actual networking of a distributed blade server system according to an embodiment of the present invention.

FIG. 1d is a schematic diagram of actual networking of a distributed blade server system according to an embodiment of the present invention. As shown in FIG. 1d, the blade server subsystem includes a set of Advanced Telecom Computing Architecture (ATCA) frames. Each ATCA frame includes 12 blades, that is, Blade 1-12. The storage system includes an active disk array and a standby disk array, and a high-speed optical fiber connection is adopted between a blade and a disk array. It should be noted that, the blade in each ATCA frame has an FC-HBA, and the FC-HBA has multiple FC ports, which may be understood as that each blade has an FC port and an eth port (the number of ports is not limited to one, but may be multiple), and an FC is provided between the FC port on the blade and the FC port on the disk array. To improve the reliability of networking, the channel (FC network) between the ATCA frame and the disk array adopts dual planes. The management channel (eth network) between the management server OSMU and the ATCA frame and the disk array also adopts dual planes (not shown in FIG. 1d).

The ATCA blade does not include a local storage disk, and the OS, the application program and the configuration data that are required during operation of the service system are stored in the disk array.

The management server OSS-Self Maintenance Unit (OSMU) provides system reliability guarantees that include quick service recovery and quick replacement in case of damaged blades, and active-standby disk array switching.

Figure 2:
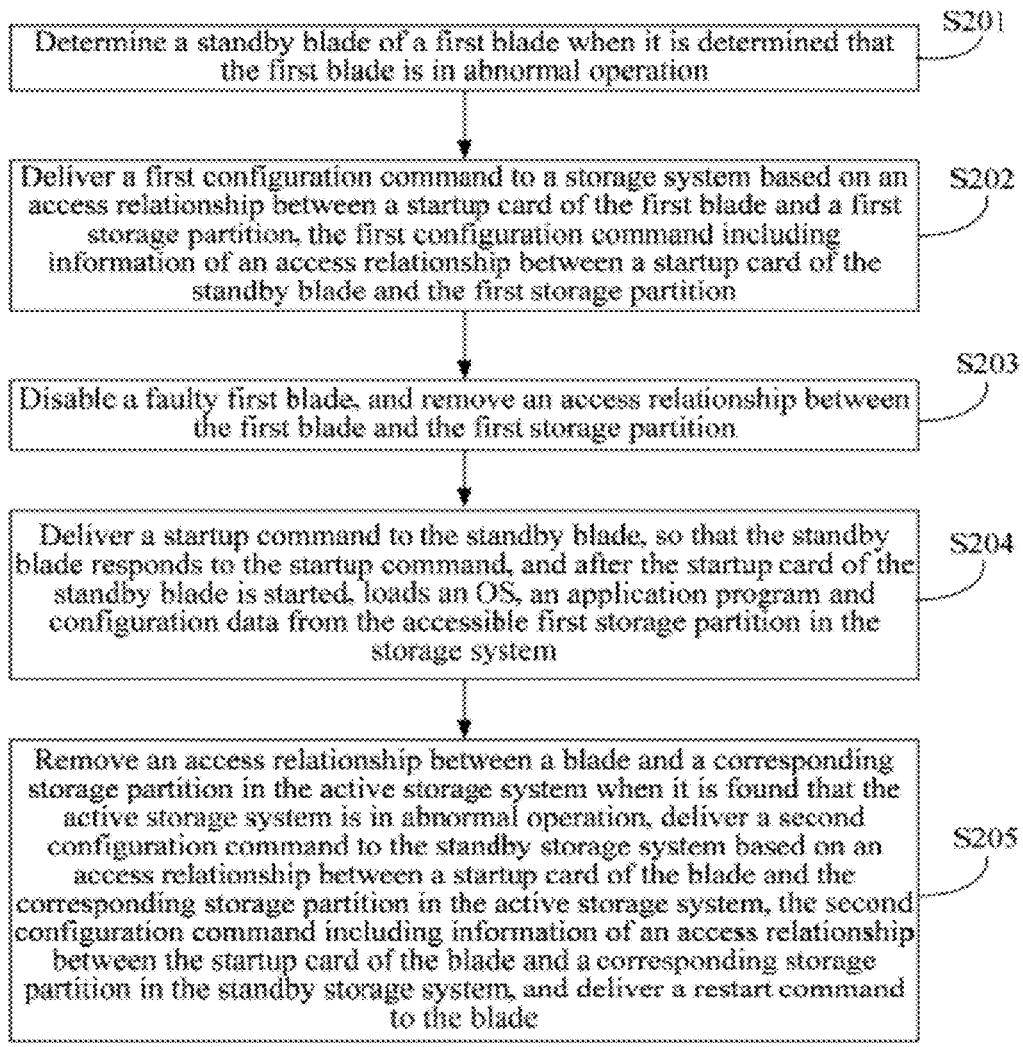
FIG. 2 is a schematic flow chart of a switching method according to an embodiment of the present invention.

FIG. 2 is a schematic flow chart of a switching method according to an embodiment of the present invention. The method may be applied to the management server in the distributed blade server system shown in FIG. 1. As shown in FIG. 2, the method may include the following steps:

S201: Determine a standby blade of a first blade when it is determined that the first blade is in abnormal operation.

In one implementation scheme, an operating state of a blade is monitored, where the operating state includes one or more combinations of a state of a network card of the blade, a heartbeat of the blade, and an operating state of an application program on the blade; and it is determined that a first blade is in abnormal operation when it is detected any one of the foregoing combinations of the first blade is abnormal.

In another implementation scheme, a fault alarm reported from a blade is monitored, and it is determined that a first blade is in abnormal operation when a fault alarm reported from the first blade is received.

Specifically, the management server saves system configuration data, the system configuration data including a blade startup card identification, a storage partition identification, and a blade state (including an active state, a standby state, and a faulty state) having a mapping relationship, and optionally further including a blade type.

Correspondingly, in one implementation scheme, the determining the standby blade of the first blade in step S201 specifically includes: determining a standby blade startup card identification of the first blade according to the system configuration data, the standby blade startup card identification being a blade startup card identification with a blade state being a standby state, or a blade startup card identification that matches a blade type of the startup card identification of the first blade and that is with a blade state being a standby state.

Alternatively, in another implementation scheme, the determining the standby blade of the first blade in step S201 specifically includes: obtaining a standby blade startup card identification of the first blade through a man-machine interface; and specifically, as shown in FIG. 1b, a standby blade startup card identification input by system maintenance personnel is received through a Web Graphical User Interface (GUI).

S202: Deliver, based on an access relationship between a startup card of the first blade and a first storage partition, a first configuration command to a storage system, the first configuration command including information of an access relationship between a startup card of the standby blade and the first storage partition, so that the storage system configures the access relationship between the startup card of the standby blade and the first storage partition.

In one implementation scheme, S202 specifically includes: delivering a first configuration command to the storage system based on a mapping relationship between a startup card identification of the first blade and a first storage partition identification, the first configuration command including information of a mapping relationship between a startup card identification of the standby blade and the first storage partition identification.

S204: Deliver a startup command to the standby blade, so that the standby blade responds to the startup command, and after the startup card of the standby blade is started, loads, from the accessible first storage partition in the storage system, an OS, an application program and configuration data.

Optionally, before step S204, the method further includes step S203.

S203: Disable a faulty first blade, and remove an access relationship between the first blade and the first storage partition.

Here, the disabling the faulty first blade refers to stopping the service of the first blade, and delivering a power-down instruction to the first blade, so as to power down the first blade.

Here, a specific implementation of removing the access relationship between the first blade and the first storage partition may be updating or deleting the mapping relationship between the startup card identification of the first blade and the first storage partition identification in a corresponding data model record; or delivering a configuration command to the storage system, so that the storage system configures the access relationship between the startup card of the first blade and the first storage partition to be invalid.

Preferably, in the distributed blade server system according to the embodiment of the present invention, the storage system 30 includes an active storage system 31 and a standby storage system 32.

Correspondingly, the method according to the embodiment of the present invention further includes step S205.

S205: Remove an access relationship between the blade 21, 22, . . . , and 2N and a corresponding storage partition in the active storage system when it is found that the active storage system is in abnormal operation, deliver a second configuration command to the standby storage system based on an access relationship between a startup card of the blade 21, 22, . . . , and 2N and the corresponding storage partition in the active storage system, the second configuration command including information of an access relationship between the startup card of the blade 21, 22, . . . , and 2N and a corresponding storage partition in the standby storage system, and deliver a restart command to the blade 21, 22, . . . , and 2N.

In one implementation scheme, step S205 specifically includes: monitoring a state of the storage system, where the state includes one or more combinations of a heartbeat of the storage system and a state of the storage system, removing an access relationship between a blade 21, 22, . . . , and 2N and the active storage system when it is detected that any one of the combinations is abnormal, delivering a second configuration command to the standby storage system based on a mapping relationship between a startup card identification of the blade 21, 22, . . . , and 2N and a corresponding storage partition identification in the active storage system, the second configuration command including information of a mapping relationship between the startup card identification of the blade 21, 22, . . . , and 2N and a corresponding storage partition identification in the standby storage system, and delivering a restart command to the blade 21, 22, . . . , and 2N.

In another implementation scheme, step S205 specifically includes: monitoring a fault alarm reported from the storage system, removing a mapping relationship between a blade 21, 22, . . . , and 2N and the active storage system when a fault alarm reported from the active storage system is received, delivering a second configuration command to the standby storage system based on a mapping relationship between a startup card identification of the blade 21, 22, . . . , and 2N and a corresponding storage partition identification in the active storage system, the second configuration command including information of a mapping relationship between the startup card identification of the blade 21, 22, . . . , and 2N and a corresponding storage partition identification in the standby storage system, and delivering a restart command to the blade 21, 22, . . . , and 2N.

Based on the above, in the switching method according to the embodiment of the present invention, a management server is disposed in a distributed blade server system with blades that do not have a local disk, and a mapping relationship between the blades and the storage partitions in the storage system is configured through the management server, so that the management server, when finding that a blade and/or a storage system is in abnormal operation, controls switching of the blade and/or the storage system. In this way, when a fault occurs in a blade and/or a storage system, a standby blade and/or a standby storage system may be quickly used for providing a service, so as to reduce the service interruption time, and thereby the system reliability is improved.

The method according to the embodiment of the present invention is introduced in detail below with reference to actual applications.

Figure 3:
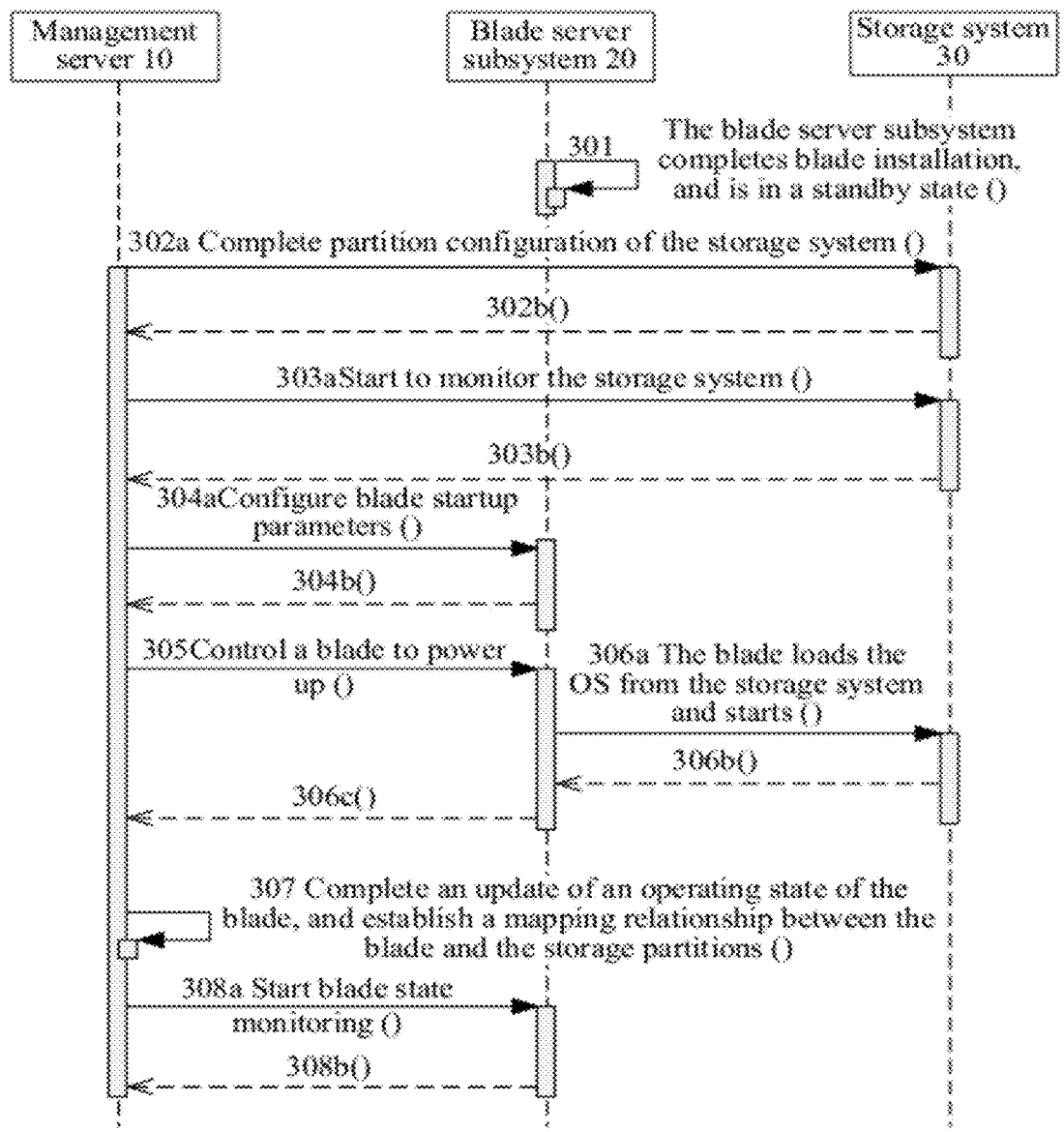
FIG. 3 is a schematic diagram of interaction of a management server participating in a blade startup process according to an embodiment of the present invention.

FIG. 3 is a schematic diagram of interaction of a management server OSMU participating in a blade startup process according to an embodiment of the present invention, which involves a blade configuration process and a storage system configuration process. The method is applied to a networking environment shown in FIG. 1, and as shown in FIG. 3, the specific message interaction may include the following steps:

S301: The blade server subsystem completes blade installation, and is in a standby state.

S302a-302b: The management server OSMU completes partition configuration of the storage system, that is, configures, by delivering a configuration command to the storage system, a blade of the blade server subsystem so that the blade of the blade server subsystem is capable of accessing a partition.

S303a-303b: The management server OSMU starts to monitor the storage system.

S304a-304b: The management server OSMU configures blade startup parameters that include a partition from which an OS is loaded, a partition of service software, and a partition of data.

S305: The management server OSMU controls a blade to power up.

S306a-306c: The blade loads the OS, starts the service software and loads the data from a pre-configured partition of the storage system.

S307: The management server OSMU completes an update of an operating state of the blade, and establishes a mapping relationship between the blade and the storage partitions.

S308a-308b: The management server OSMU starts blade state monitoring.

Figure 4A:
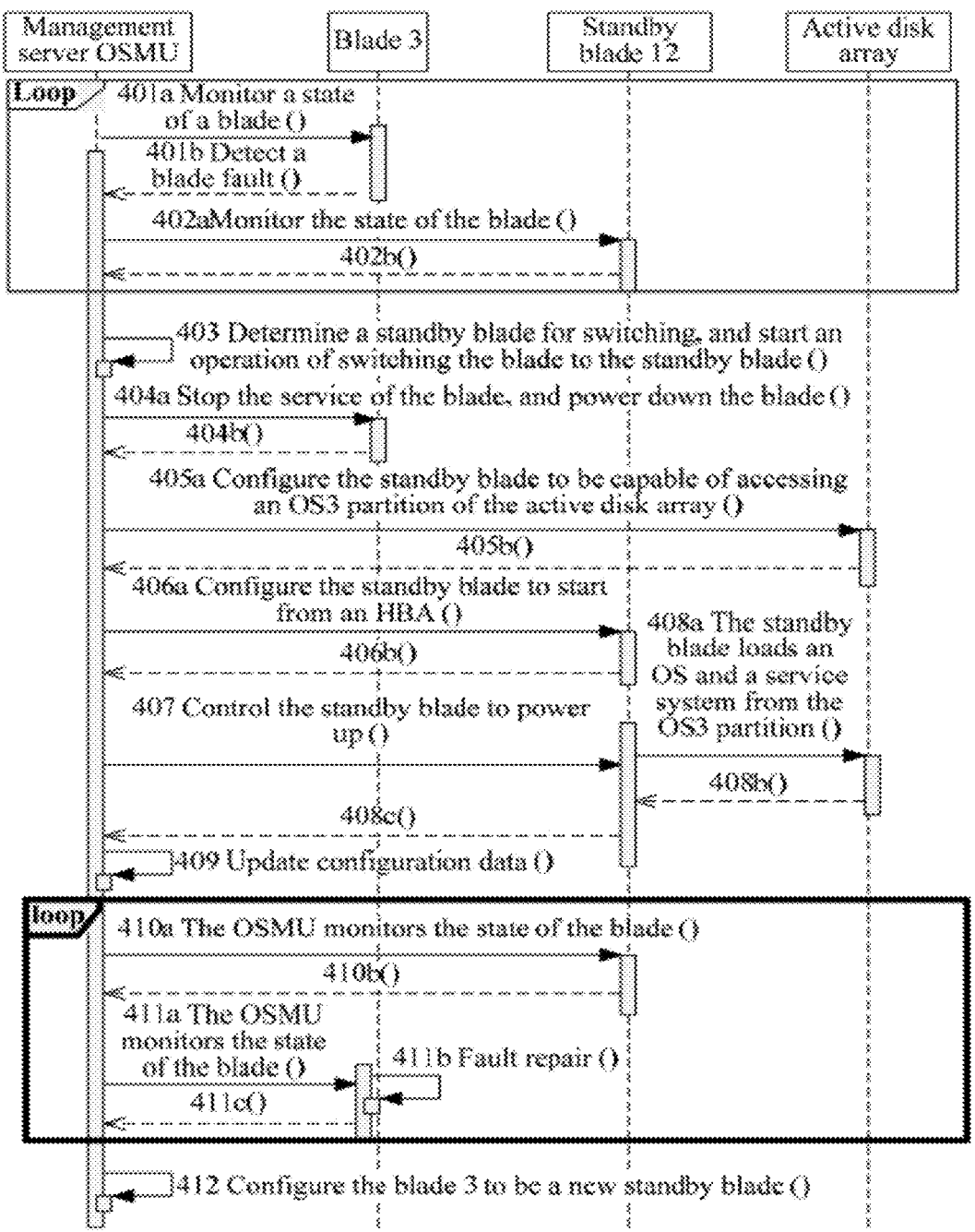
FIG. 4a is a schematic diagram of interaction of a management server participating in a blade switching process according to an embodiment of the present invention.
Figure 4B:
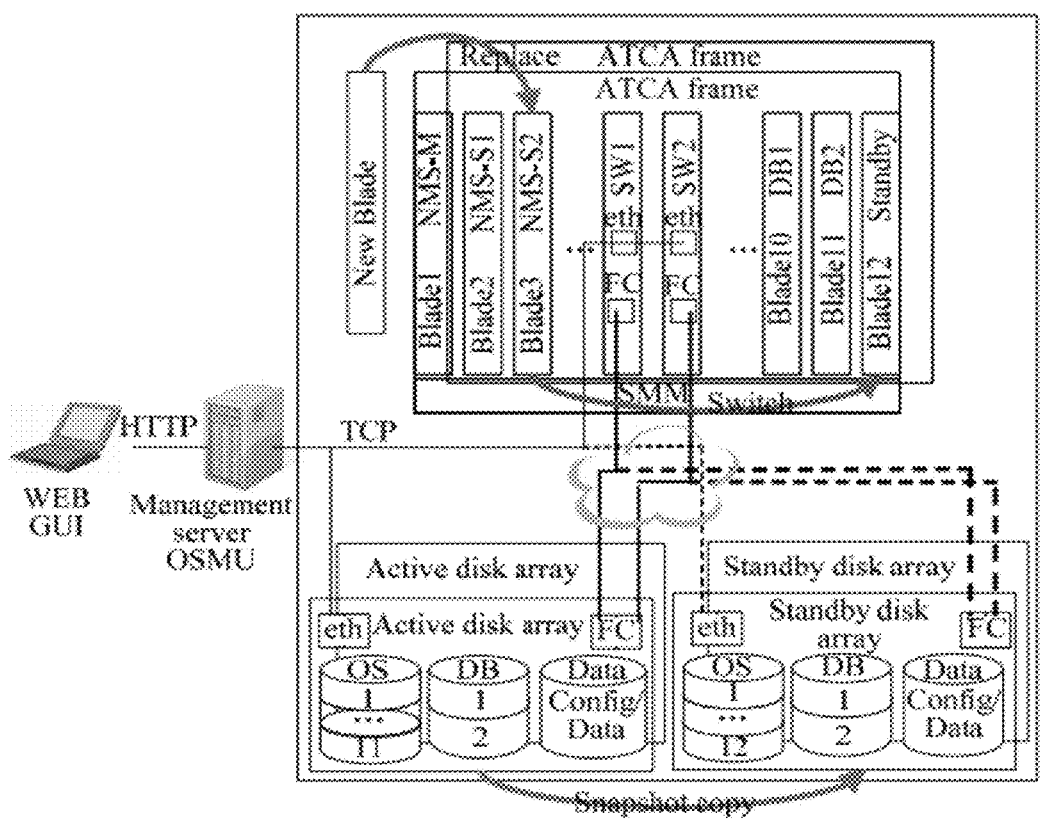

FIG. 4a is a schematic diagram of interaction of a management server OSMU participating in a blade switching process according to an embodiment of the present invention. The method is applied to a networking environment shown in FIG. 4b. The management server OSMU monitors the operating states of all blades in real time, and after automatically recognizing that a fault occurs in a blade 3 (Blade3), starts a blade switching procedure to automatically switch a service on the blade 3 to a standby blade 12. As shown in FIG. 4a, the specific message interaction may include the following steps:

S401a-402b: The management server OSMU monitors, in real time, the operating states of all blades in the blade server subsystem, and recognizes that a fault occurs in a blade Blade3 of Slot3, as shown in FIG. 4b.

It should be understood that, monitoring of the state of the blade 3 by the management server OSMU is taken as an example here, which is a loop process.

Monitoring of the state of the blade 12 (the blade 12 is in a standby state) by the management server OSMU is taken as an example here, which is a loop process.

S403: The management server OSMU determines a standby blade for switching, that is, selects a standby blade 12 from the standby blades for switching, and starts an operation of switching the blade 3 to the standby blade 12.

Specifically, the management server OSMU knows that Blade12 is in a standby state by retrieving a data model record.

In one implementation scheme, the data model record saves a blade service type, a disk array partition type, a blade startup card identification, a disk array partition identification and a blade state (including an active state, a standby state, and a faulty state) that have a mapping relationship; and parameter configuration required for blade management and disk array management. For example, a type of disk array partition includes as shown in FIG. 4b, disk array partitions of an OS type, disk array partitions of a DB type, and disk array partitions of a DATA type.

S404a-404b: The management server OSMU stops the service of the blade 3, and delivers a power-down instruction to the blade 3, that is, Blade3, so as to power down the blade 3.

It should be noted that, step S403 and step S404a-404b are not limited to a particular order.

S405a-405b: The management server OSMU configures the blade 12 to be capable of accessing a partition on the active disk array where original loaded content of the blade 3 is located, for example, an OS3 partition.

That is, the management server OSMU delivers a configuration command to the active disk array, the configuration command including information of a mapping relationship between a startup card identification of the blade 12 and an OS3 partition identification.

S406a-406b: The management server OSMU configures the blade 12 to start from an HBA.

That is, the management server OSMU delivers a configuration command to the blade 12, the configuration command including information for indicating that a startup mode is startup from an HBA.

It should be understood that, in different application scenarios, the startup mode includes, but is not limited to, local disk startup, startup from an HBA, and startup from a Universal Serial Bus (USB), and is local disk startup by default. In the embodiment of the present invention, the startup mode of the standby blade is configured to be startup from an HBA.

S407: The management server OSMU performs a power-up operation on Slot12, so as to control the standby blade 12 to power up.

That is, a startup command is delivered to the standby blade 12.

S408a-408c: The standby blade 12 responds to the startup command, and after the HBA is started, loads an OS, service software and data from the accessible OS3 partition of the active disk array.

After system recovery, a service on the blade 12 is started.

S409: The management server OSMU updates system configuration data, which includes: updating, in the data model record, the blade 3 to be in a faulty state, the blade 12 to be in an active state, and the disk array partition accessed by the blade 12.

S410a-410b: The management server OSMU continues monitoring the state of the blade 12, which is a loop process.

S411a-411c: The management server OSMU continues monitoring the state of the blade 3, and detects that the fault of the blade 3 is repaired, which is a loop process.

S412: Update configuration data, which includes: updating the state of the blade 3 in the data model record to be in a standby state.

It should be understood that, the management server OSMU may display the state of each board on a device panel figure in real time, and a user may know by monitoring that a fault occurs in Blade3 (an alarm prompt is provided), and that Blade12 is in an active state.

The user repairs or replaces Blade3 according to the alarm prompt of the management server OSMU. After repair or replacement is completed, the management server OSMU updates the data model record, which includes configuring Blade3 to be in a standby state for use by subsequent blade service switching and recovery.

Based on the above, the embodiment of the present invention provides a switching method, in which a management server is disposed in a distributed blade server system with blades that do not have a local disk, and a mapping relationship between the blades and the storage partitions in the storage system is configured through the management server, so that the management server, when finding that a blade is in abnormal operation, controls switching of the blade. In this way, when a fault occurs in a blade, a standby blade may be quickly used for providing a service, so as to reduce the service interruption time, and thereby the system reliability is improved.

Figure 5A:
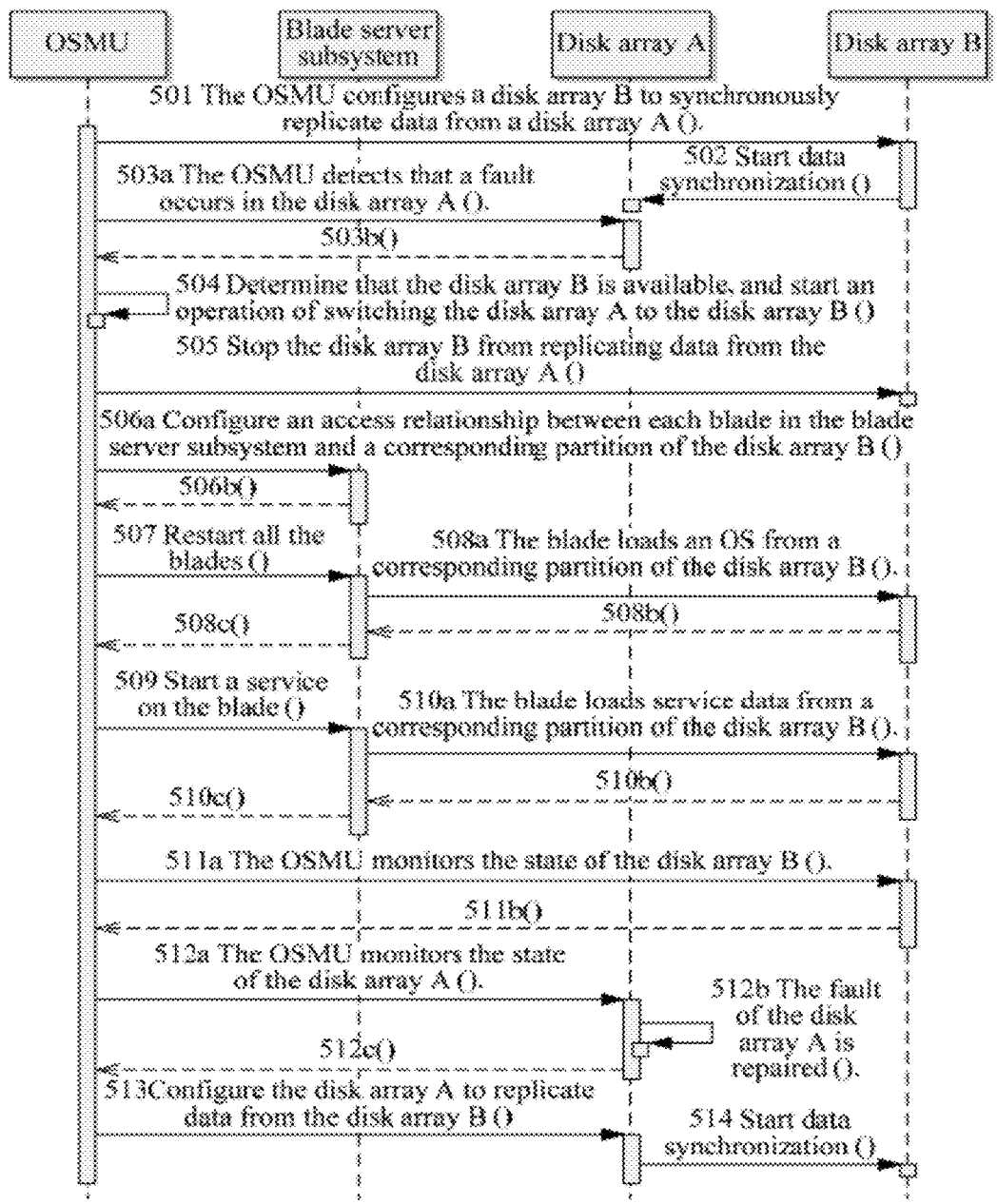
FIG. 5a is a schematic diagram of interaction of a management server participating in a disk array switching process according to an embodiment of the present invention.
Figure 5B:
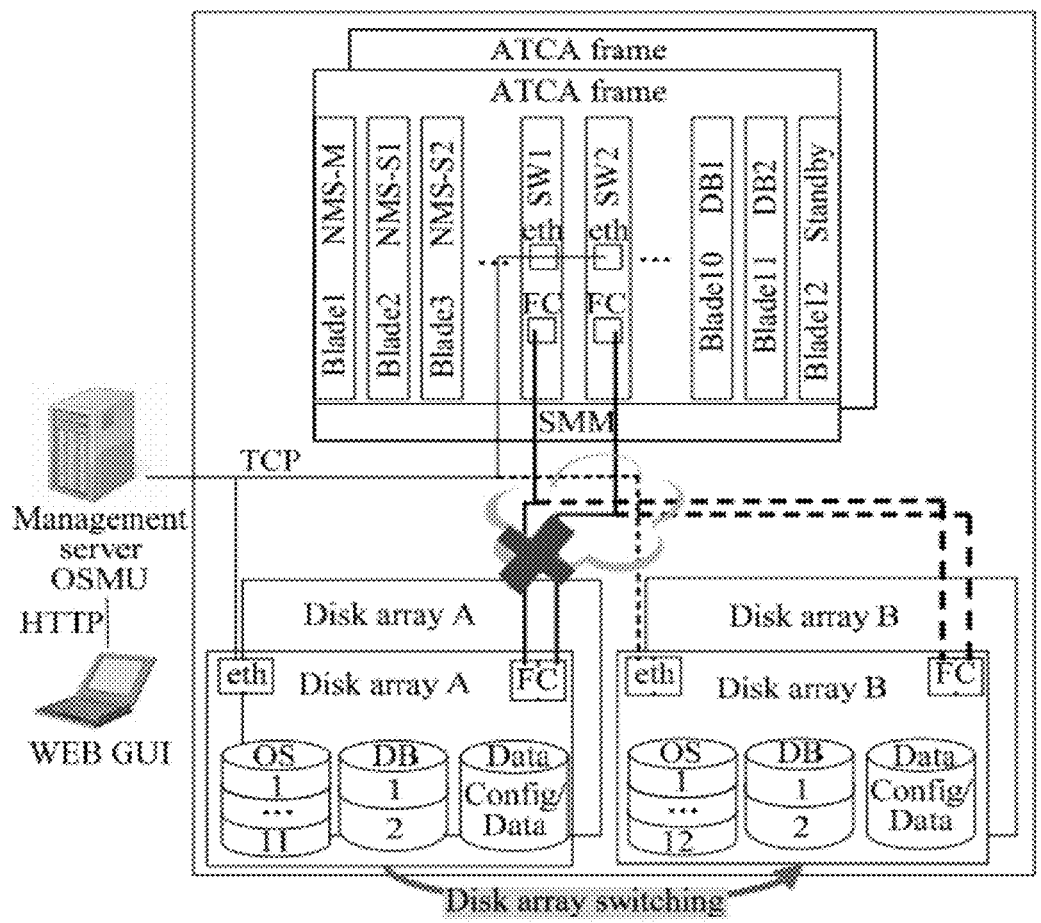

FIG. 5a is a schematic diagram of interaction of a management server OSMU participating in a disk array switching process according to an embodiment of the present invention. The method is applied to a networking environment shown in FIG. 5b. The management server OSMU monitors the operating states of the disk arrays in real time, and after automatically recognizing that a fault occurs in the active disk array, that is, a fault occurs in a disk array A, starts a disk array switching procedure. As shown in FIG. 5a, specific message interaction may include the following steps:

S501: The OSMU configures a disk array B to synchronously replicate data from a disk array A (that is, a current active disk array).

S502: Start data synchronization between the disk array A and the disk array B.

S503a-503b: The OSMU detects that a fault occurs in the disk array A.

S504: The OSMU determines that the disk array B is available, and starts an operation of switching the disk array A to the disk array B.

S505: Stop the disk array B from replicating data from the disk array A.

That is, the OSMU cuts off timed snapshot, and copy and backup mechanism between the active disk arrays and standby disk arrays.

S506a-506b: Configure an access relationship between each of multiple blades in the blade server subsystem and a corresponding partition of the disk array B. Here, the multiple blades may be blades in an active state, or all blades in the blade server subsystem.

That is, the management server OSMU delivers a configuration command to the disk array B, the configuration command including information of a mapping relationship between a startup card identification of each of multiple blades and a corresponding partition identification of the disk array B. In one implementation scheme, the configuration command includes two range intervals, in which one range interval represents startup card identifications of multiple blades in the blade server subsystem, and the other range interval represents multiple partition identifications in the disk array B corresponding to the startup card identifications of the multiple blades.

It should be noted that, the OSMU configures an access relationship between each blade and a corresponding partition of the disk array B based on an access relationship between each blade and a corresponding partition of the disk array A in the data model record; and configures the disk array B to be in an active state and the disk array A to be in a faulty state, and updates the configuration into the data model record of the OSMU.

S507: Restart the multiple blades in the blade server subsystem.

That is, a restart command is delivered to the blades.

S508a-508c: The blade loads an OS from a corresponding partition of the disk array B.

That is, the blade responds to the restart command, and after the HBA is started, loads an OS from a storage partition in the disk array B identified by a storage partition identification associated with an identification WWN of a port of the HBA.

S509: Start a service on the blade.

S510a-510c: The blade loads service data from a corresponding partition of the disk array B.

S511a-S11b: The OSMU monitors the state of the disk array B.

S512a-512c: The OSMU monitors the state of the disk array A, and detects that the fault of the disk array A is repaired.

S513: The OSMU configures the disk array A for new standby storage, and configures the disk array A to synchronously replicate data from the disk array B.

S514: Start data synchronization between the disk array B and the disk array A.

It should be noted that, step S511 and step S512 are not limited to a particular order.

The OSMU displays the state of each disk array on a device panel figure in real time, a user may know by monitoring that a fault occurs in an original active disk array (the disk array A), and an original standby disk array (the disk array B) is in an active state. The user repairs or replaces the disk array A according to an alarm prompt of the OSMU. After repair or replacement is completed, the OSMU updates the data model record, and configures the disk array A to be in a standby state. The OSMU automatically recovers snapshot copy mechanism (that is, copy from the disk array B to the disk array A) between the active disk arrays and standby disk arrays for use by subsequent disk array switching and recovery.

Based on the above, the embodiment of the present invention provides a switching method, in which a management server is disposed in a distributed blade server system with blades that do not have a local disk, and a mapping relationship between the blades and the storage partitions in the storage system is configured through the management server, so that the management server, when finding that a storage system is in abnormal operation, controls switching of the storage system. In this way, when a fault occurs in a storage system, a standby storage system may be quickly used for providing a service, so as to reduce the service interruption time, and thereby the system reliability is improved.

Figure 6:
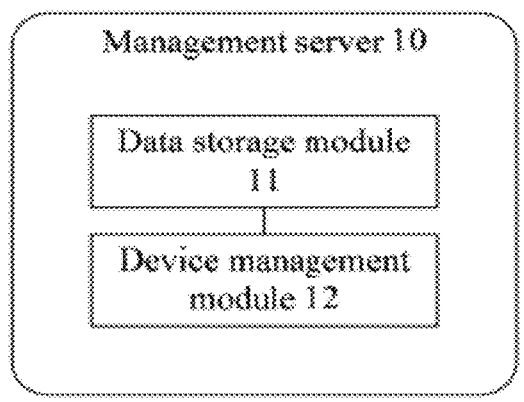
FIG. 6 is a schematic structural diagram of a management server according to an embodiment of the present invention.

FIG. 6 is a schematic structural diagram of a management server according to an embodiment of the present invention. As shown in FIG. 6, the management server includes a data storage module 11 and a device management module 12.

The data storage module 11 is configured to save system configuration data, where the system configuration data includes one or more parameters in a mapping relationship between a blade startup card identification, a storage system partition identification, and a blade state.

Here, the blade state includes an active state, a standby state, and a faulty state.

The device management module 12 is configured to determine a standby blade of a first blade when it is determined/found that the first blade is in abnormal operation; deliver, based on an access relationship between a startup card of the first blade and a first storage partition, a first configuration command to a storage system, the first configuration command including information of an access relationship between a startup card of the determined standby blade and the first storage partition; and deliver a startup command to the determined standby blade.

In one implementation scheme, the data storage module 11 is specifically configured to store a data model record, where the data model record includes: a blade service type, a disk array partition type, a blade startup card identification, a disk array partition identification and a blade state (including an active state, a standby state, and a faulty state) that have a mapping relationship; and configured to save parameter configuration required for blade, a Shelf Management Module (SMM) and storage system management.

It should be noted that, the startup card of the determined standby blade is identified by any one of the following: a blade startup card identification with a blade state being a standby state, or a blade startup card identification that matches a blade type of the startup card identification of the first blade and that is with a blade state being a standby state, or a standby blade startup card identification obtained through a man-machine interface.

Specifically, if the system configuration data further includes a blade type, the startup card identification of the determined standby blade in the device management module 12 may be: a blade startup card identification that matches a blade type of the startup card identification of the first blade and that is with a blade state being a standby state.

If it does not need to distinguish the blade type of the multiple blades 21, 22, . . . , and 2N in the distributed blade server system according to the embodiment of the present invention, the startup card identification of the determined standby blade may be: a blade startup card identification with a blade state being a standby state.

Preferably, as shown in FIG. 1b, in the distributed blade server system according to the embodiment of the present invention, the management server according to the embodiment of the present invention is in communication connection with the blade server subsystem and the storage system through a network, the storage system 30 includes an active storage system 31 and a standby storage system 32, and each storage system includes multiple storage partitions 1, 2, . . . , and N.

Correspondingly, the device management module 12 is further configured to remove an access relationship between a startup card of the blade 21, 22, . . . , and 2N and a corresponding storage partition in the active storage system 31 when it is found/determined that the active storage system is in abnormal operation, deliver a second configuration command to the standby storage system 32 based on an access relationship between the blade 21, 22, . . . , and 2N and the corresponding storage partition in the active storage system 31, the second configuration command including information of an access relationship between the startup card of the blade 21, 22, . . . , and 2N and a corresponding storage partition in the standby storage system 32, and deliver a restart command to the blade 21, 22, . . . , and 2N.

It should be noted that, the restart command may be delivered to all blades in the blade server subsystem, or blades in an active state.

In one implementation scheme, the device management module 12 is a first device management module, configured to monitor an operating state of a blade, where the operating state includes one or more combinations of a state of a network card of the blade, a heartbeat of the blade, and a state of an application program on the blade, and determine a standby blade of a first blade when detecting that the first blade is in abnormal operation; deliver a first configuration command to the storage system based on a mapping relationship between a startup card identification of the first blade and a first storage partition identification, the first configuration command including information of a mapping relationship between a startup card identification of the determined standby blade and the first storage partition identification; and deliver a startup command to the determined standby blade.

Preferably, in the management server according to the embodiment of the present invention, the first device management module is further configured to monitor a state of the storage system, where the state includes one or more combinations of a heartbeat of the storage system and a state of the storage system, remove an access relationship between a blade 21, 22, . . . , and 2N and the active storage system when detecting that the active storage system is in abnormal operation, deliver a second configuration command to the standby storage system based on a mapping relationship between a startup card identification of the blade 21, 22, . . . , and 2N and a corresponding storage partition identification in the active storage system, the second configuration command including information of a mapping relationship between the startup card identification of the blade 21, 22, . . . , and 2N and a corresponding storage partition identification in the standby storage system, and deliver a restart command to the blade 21, 22, . . . , and 2N.

In another implementation scheme, the device management module 12 is a second device management module, configured to monitor a fault alarm reported from a blade, and determine a standby blade of a first blade when receiving a fault alarm reported from the first blade; deliver a first configuration command to the storage system based on a mapping relationship between a startup card identification of the first blade and a first storage partition identification, the first configuration command including information of a mapping relationship between a startup card identification of the determined standby blade and the first storage partition identification; and deliver a startup command to the determined standby blade.

Preferably, in the management server according to the embodiment of the present invention, the second device management module is further configured to monitor a fault alarm reported from the storage system, remove a mapping relationship between a blade 21, 22, . . . , and 2N and the active storage system when receiving a fault alarm reported from the active storage system, deliver a second configuration command to the standby storage system based on a mapping relationship between a startup card identification of the blade 21, 22, . . . , and 2N and a corresponding storage partition identification in the active storage system, the second configuration command including information of a mapping relationship between the startup card identification of the blade 21, 22, . . . , and 2N and a corresponding storage partition identification in the standby storage system, and deliver a restart command to the blade 21, 22, . . . , and 2N.

It may be seen that, the embodiment of the present invention provides a management server, in which the management server is disposed in a distributed blade server system with blades that do not have a local disk, and a mapping relationship between the blades and the storage partitions in the storage system is configured through the management server, so that the management server, when finding that a blade and/or a storage system is in abnormal operation, controls switching of the blade and/or the storage system. In this way, when a fault occurs in a blade and/or a storage system, a standby blade and/or a standby storage system may be quickly used for providing a service, so as to reduce the service interruption time, and thereby the system reliability is improved.

Figure 7:
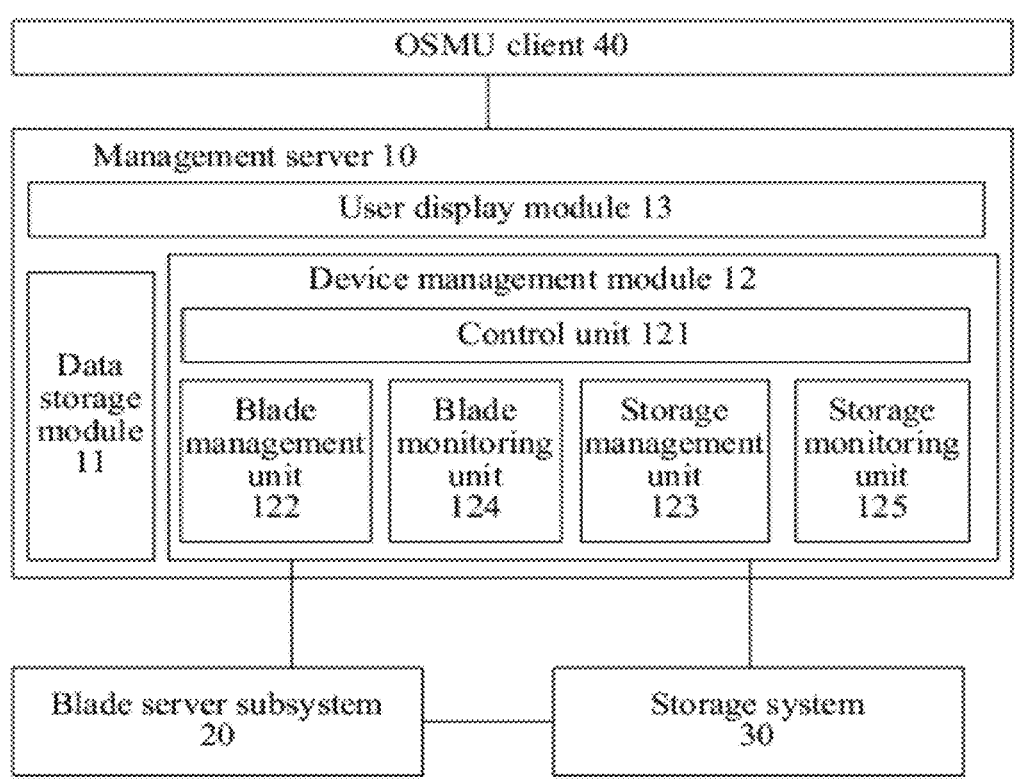
FIG. 7 is a schematic structural diagram of another management server according to an embodiment of the present invention.

FIG. 7 is a schematic structural diagram of a management server according to another embodiment of the present invention. As shown in FIG. 7, this embodiment may further include a user display module 13 based on the device shown in FIG. 6.

The user display module 13 is configured to receive system configuration data configured by a user, where the system configuration data includes one or more parameters in a mapping relationship between a blade startup card identification, a storage system partition identification, and a blade state; and display operating states of a blade server subsystem and a storage system.

Correspondingly, the device management module 12 is responsible for monitoring and managing the blade server subsystem and the storage system, and specifically may include a control unit 121, a blade management unit 122, a storage management unit 123, a blade monitoring unit 124 and a storage monitoring unit 125.

The control unit 121 is configured to trigger the behavior of the blade management unit 122 based on user configuration data or a feedback from the blade monitoring unit 124; or trigger the behavior of the storage management unit 123 based on user configuration data or a feedback from the storage monitoring unit 125; and start a monitoring task according to the user configuration data.

It should be understood that, after system power-up, in an initial state, the control unit 121 is specifically configured to trigger the behavior of the blade management unit 122 or the storage management unit 123 based on user configuration data.

The blade monitoring unit 124 is configured to monitor an operating state of each blade in the blade server subsystem, and notify the control unit 121 when detecting that the first blade is in abnormal operation.

The blade management unit 122 responds to the trigger of the control unit 121, and is configured to deliver a first configuration command to the storage system based on a mapping relationship between a first blade startup card identification and a first storage partition identification maintained by the data storage module 11, the first configuration command including information of a mapping relationship between a startup card identification of a determined standby blade and the first storage partition identification, and deliver a startup command to the determined standby blade, thereby configuring the mapping relationship between a startup card of the determined standby blade and the first storage partition, and starting the standby blade.

It should be understood that, in one implementation scheme, the system configuration data in the data storage module 11 is updated, to delete an item representing the mapping relationship between the first blade startup card identification and the first storage partition identification.

Preferably, as shown in FIG. 1b, in the distributed blade server system according to the embodiment of the present invention, the storage system 30 includes an active storage system 31 and a standby storage system 32, and each storage system includes multiple storage partitions 1, 2, . . . , and N.

The storage monitoring unit 125 is configured to monitor the operating state of the storage system, and notify the control unit 121 when finding that the active storage system is in abnormal operation.

The storage management unit 123 responds to the trigger of the control unit 121, is configured to deliver a second configuration command to the standby storage system based on a mapping relationship between a startup card identification of each blade and a corresponding storage partition identification in the active storage system maintained by the data storage module 11, the second configuration command including information of a mapping relationship between the startup card identification of each blade and a corresponding storage partition identification in the standby storage system, and is configured to deliver a restart command to each blade, thereby configuring a mapping relationship between a startup card of each blade and a corresponding storage partition in the standby storage system, and restarting all the blades.

It should be understood that, in one implementation scheme, the system configuration data in the data storage module 11 is updated, to update the mapping relationship between the startup card identification of each blade and the corresponding storage partition in the active storage system to the mapping relationship between the startup card identification of each blade and the corresponding storage partition identification in the standby storage system.

In actual applications, the management server according to the embodiment of the present invention may be deployed in different manners, for example, the management server is deployed on an independent server, or, as shown in FIG. 1c, deployed on a blade in the blade server subsystem.

For the specific implementation of the above functional units, reference may be made to the description of the method embodiments.

Each unit of the apparatus according to the embodiment of the present invention may be integrated or independently deployed. The above units may be combined into one unit, or further divided into a plurality of subunits.

An embodiment of the present invention further provides another distributed blade server system, which includes a management server, a storage system and a blade server subsystem including multiple blades, the management server being in communication connection with the blade server subsystem and the storage system through a network.

The management server is configured to determine a standby blade of a first blade when it is determined that the first blade is in abnormal operation, deliver a first configuration command to the storage system, the first configuration command being used for indicating that the determined standby blade is capable of accessing a first storage partition where original loaded content of the first blade is located, and deliver a startup command to the determined standby blade.

The storage system includes multiple storage partitions, and saves an OS, an application program and configuration data that are required by the multiple blades; and is configured to respond to the first configuration command to configure an access relationship between the standby blade and the first storage partition where the original loaded content of the first blade is located, so as to enable the standby blade to access the first storage partition.

The standby blade is configured to respond to the startup command, and after the startup card of the standby blade is started, load, from the accessible first storage partition in the storage system, the OS, the application program and the configuration data.

In one implementation scheme, the management server according to the embodiment of the present invention does not maintain system configuration data having a mapping relationship.

Correspondingly, the management server is specifically configured to determine a standby blade of a first blade when it is determined that the first blade is in abnormal operation, deliver a first configuration command to the storage system, the first configuration command including a startup card identification of the determined standby blade and a startup card identification of the faulty first blade, and deliver a startup command to the determined standby blade.

Correspondingly, the storage system is specifically configured to respond to the first configuration command, determine that the startup card identification of the first blade is corresponding to a first storage partition identification, and configure a mapping relationship between the startup card identification of the determined standby blade and the first storage partition identification.

Correspondingly, the standby blade is specifically configured to respond to the startup command, and after the startup card of the standby blade is started, load the OS, the application program and the configuration data from a first storage partition identified by the first storage partition identification associated with the startup card identification of the standby blade.

In another implementation scheme, the management server according to the embodiment of the present invention maintains system configuration data having a mapping relationship, and correspondingly, for the specific implementation of the processing and functions of the management server, the storage system and the blade, reference may be made to the description of the above embodiments.

It should be noted that, the terms "first" and "second" used in the description of the above embodiments are used for ease of distinguishing, but not intended to limit an order.

Based on the above, in the embodiments of the present invention, a management server is disposed in a distributed blade server system with blades that do not have a local disk, and a mapping relationship between the blades and the storage partitions in the storage system is configured through the management server, so that the management server, when finding that a blade and/or a storage system is in abnormal operation, controls switching of the blade and/or the storage system. In this way, when a fault occurs in a blade and/or a storage system, a standby blade and/or a standby storage system may be quickly used for proving a service, so as to reduce the service interruption time, and thereby the system reliability is improved.

Persons skilled in the art should understand that all or a part of the steps of the method according to the embodiments of the present invention may be implemented by a program instructing relevant hardware (such as a processor). The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

The above descriptions are exemplary embodiments of the present invention. It should be noted by persons skilled in the art that modifications and variations may be made without departing from the principle of the present invention, which should be also construed as falling within the protection scope of the present invention.

What is claimed is:

1. A distributed blade server system, comprising:
a management server, a storage system, and a blade server subsystem comprising multiple blades, the management server being in connection with the blade server subsystem and the storage system through a network;
wherein the management server is configured to:
determine a standby blade of a first blade when it is determined that the first blade is in abnormal operation,
to deliver, based on an access relationship between a startup card of the first blade and a first storage partition, a first configuration command to the storage system, wherein the first configuration command comprises information of an access relationship between a startup card of the determined standby blade and the first storage partition,
to deliver a startup command to the determined standby blade,
to save system configuration data, wherein the system configuration data comprises a blade startup card identification, a storage partition identification, and a blade state that has a mapping relationship,
to monitor a state of the active storage system,
to remove a mapping relationship between a blade and the active storage system when detecting that the active storage system is in abnormal operation,
to deliver a second configuration command to the standby storage system based on a mapping relationship between a startup card identification of the blade and a corresponding storage partition identification in the active storage system, wherein the second configuration command comprises information of a mapping relationship between the startup card identification of the blade and a corresponding storage partition identification in the standby storage system, and
to deliver a restart command to the blade;
wherein the storage system comprises multiple storage partitions, an active storage system, and a standby storage system and is configured to:
save an operating system, an application program and configuration data that are required by the multiple blades, and
to respond to the first configuration command to configure the access relationship between the startup card of the standby blade and the first storage partition, so as to enable the standby blade to access the first storage partition; wherein the standby blade is configured to:
respond to the startup command, and
after the startup card of the standby blade is started, to load, from the accessible first storage partition in the storage system, the operating system, the application program and the configuration data;
wherein the standby storage system is configured to:
respond to the second configuration command to configure the mapping relationship between the startup card identification of the blade and the corresponding storage partition identification in the standby storage system; and
wherein the blade is further configured to:
respond to the restart command, and
after the startup card of the blade is started, to load the operating system, the application program and the configuration data from a storage partition in the standby storage system identified by the storage partition identification associated with the startup card identification.

2. The system according to claim 1, wherein the management server is further configured to:

monitor an operating state of a blade, determine a standby blade of a first blade when detecting that the first blade is in abnormal operation, deliver a first configuration command to the storage system based on a mapping relationship between a startup card identification of the first blade and a first storage partition identification, wherein the first configuration command comprises information of a mapping relationship between a startup card identification of the determined standby blade and the first storage partition identification, and deliver a startup command to the determined standby blade;

wherein the storage system is further configured to respond to the first configuration command to configure the mapping relationship between the startup card identification of the standby blade and the first storage partition identification; and wherein the standby blade is further configured to:

respond to the startup command, and after the startup card of the standby blade is started, to load the operating system, the application program and the configuration data from a first storage partition identified by the first storage partition identification associated with the startup card identification of the standby blade.

3. A management server, comprising a memory comprising a computer readable storage medium; and a processor configured to execute a computer program stored in the memory, wherein the computer program comprises:

a data storage module, configured to save system configuration data, wherein the system configuration data comprises one or more parameters in a mapping relationship between a blade startup card identification, a storage system partition identification, and a blade state; and a device management module, configured to:

determine a standby blade of a first blade when it is determined that the first blade is in abnormal operation, deliver, based on an access relationship between a startup card of the first blade and a first storage partition, a first configuration command to a storage system, wherein the first configuration command comprises information of an access relationship between a startup card of the determined standby blade and the first storage partition and wherein the storage system includes an active storage system having multiple storage partitions and a standby storage system having multiple storage partitions, deliver a startup command to the determined standby blade, remove an access relationship between a blade and a corresponding storage partition in the active storage system when it is determined that the active storage system is in abnormal operation, deliver a second configuration command to the standby storage system based on an access relationship between a startup card of the blade and the corresponding storage partition in the active storage system, wherein the second configuration command comprises information of an access relationship between the startup card of the blade and a corresponding storage partition in the standby storage system, and deliver a restart command to the blade.

4. The management server according to claim 3, wherein device management module is further configured to monitor a state of the storage system, wherein the state comprises one or more combinations of a heartbeat of the storage system and a state of the storage system, remove an access relationship between a blade and the active storage system when detecting that the active storage system is in abnormal operation, deliver a second configuration command to the standby storage system based on a mapping relationship between a startup card identification of the blade and a corresponding storage partition identification in the active storage system, wherein the second configuration command comprises information of a mapping relationship between the startup card identification of the blade and a corresponding storage partition identification in the standby storage system, and deliver a restart command to the blade.

5. The management server according to claim 3, wherein the device management module is further configured to monitor a fault alarm reported from the storage system, remove a mapping relationship between a blade and the active storage system when receiving a fault alarm reported from the active storage system, deliver a second configuration command to the standby storage system based on a mapping relationship between a startup card identification of the blade and a corresponding storage partition identification in the active storage system, wherein the second configuration command comprises information of a mapping relationship between the startup card identification of the blade and a corresponding storage partition identification in the standby storage system, and configured to deliver a restart command to the blade.

6. A switching method, applicable to a management server, comprising:

determining a standby blade of a first blade when it is determined that the first blade is in abnormal operation;

delivering, based on an access relationship between a startup card of the first blade and a first storage partition, a first configuration command to a storage system, wherein the first configuration command comprises information of an access relationship between a startup card of the standby blade and the first storage partition, so that the storage system configures the access relationship between the startup card of the standby blade and the first storage partition; and delivering a startup command to the standby blade, so that the standby blade responds to the startup command, and after the startup card of the standby blade is started, loads, from the accessible first storage partition in the storage system, an operating system, an application program and configuration data, wherein system configuration data is stored at the management server and comprises a blade startup card identification, a storage partition identification, and a blade state that have a mapping relationship;

the standby blade of the first blade is identified by: a blade startup card identification with a blade state being a standby state, or a blade startup card identification that matches a blade type of the startup card identification of the first blade and that is with a blade state being a standby state, or a standby blade startup card identification obtained through a man-machine interface; and the delivering the first configuration command to the storage system based on the access relationship between the startup card of the first blade and the first storage partition, the first configuration command comprising the information of the access relationship between the startup card of the standby blade and the first storage partition, comprises: delivering a first configuration command to the storage system based on a mapping relationship between a startup card identification of the first blade and a first storage partition identification the first configuration command comprising information of a mapping relationship between a startup card identification of the standby blade and the first storage partition identification.

7. A distributed blade server system, comprising:

a management server, a storage system, and a blade server subsystem comprising multiple blades, the management server being in connection with the blade server subsystem and the storage system through a network, wherein:

the management server is configured to determine a standby blade of a first blade when it is determined that the first blade is in abnormal operation; deliver, based on an access relationship between a startup card of the first blade and a first storage partition, a first configuration command to the storage system, wherein the first configuration command comprises information of an access relationship between a startup card of the determined standby blade and the first storage partition; and deliver a startup command to the determined standby blade;

the storage system comprises multiple storage partitions, and is configured to saves an operating system, an application program and configuration data that are required by the multiple blades; and is configured to respond to the first configuration command to configure the access relationship between the startup card of the standby blade and the first storage partition, so as to enable the standby blade to access the first storage partition; and the standby blade is configured to respond to the startup command, and after the startup card of the standby blade is started, load, from the accessible first storage partition in the storage system, the operating system, the application program and the configuration data;

wherein the management server is further configured to save system configuration data, the system configuration data comprising a blade startup card identification, a storage partition identification, and a blade state that have a mapping relationship; and configured to monitor a fault alarm reported from a blade, and determine a standby blade of a first blade when receiving a fault alarm reported from the first blade; deliver a first configuration command to the storage system based on a mapping relationship between a startup card identification of the first blade and a first storage partition identification, wherein the first configuration command comprises information of a mapping relationship between a startup card identification of the determined standby blade and the first storage partition identification; and deliver a startup command to the determined standby blade;

the storage system is further configured to respond to the first configuration command to configure the mapping relationship between the startup card identification of the standby blade and the first storage partition identification; and the standby blade is further configured to respond to the startup command, and after the startup card of the standby blade is started, load the operating system, the application program and the configuration data from a first storage partition identified by the first storage partition identification associated with the startup card identification of the standby blade.

8. The system according to claim 7, wherein the storage system comprises an active storage system and a standby storage system, the management server is further configured to monitor a fault alarm reported from the storage system, remove a mapping relationship between a blade and the active storage system when receiving a fault alarm reported from the active storage system, deliver a second configuration command to the standby storage system based on a mapping relationship between a startup card identification of the blade and a corresponding storage partition identification in the active storage system, wherein the second configuration command comprises information of a mapping relationship between the startup card identification of the blade and a corresponding storage partition identification in the standby storage system, and configured to deliver a restart command to the blade;

the standby storage system is configured to respond to the second configuration command to configure the mapping relationship between the startup card identification of the blade and the corresponding storage partition identification in the standby storage system; and the blade is further configured to respond to the restart command, and after the startup card of the blade is started, load the operating system, the application program and the configuration data from a storage partition in the standby storage system identified by the storage partition identification associated with the startup card identification.

9. A management server, comprising a memory; and a processor configured to execute the computer program stored in the memory, wherein the computer program comprises:

a data storage module, configured to save system configuration data, wherein the system configuration data comprises one or more parameters in a mapping relationship between a blade startup card identification, a storage system partition identification, and a blade state; and a device management module, configured to determine a standby blade of a first blade when it is determined that the first blade is in abnormal operation; deliver, based on an access relationship between a startup card of the first blade and a first storage partition, a first configuration command to a storage system, wherein the first configuration command comprises information of an access relationship between a startup card of the determined standby blade and the first storage partition; and deliver a startup command to the determined standby blade, wherein the device management module is further configured to monitor a fault alarm reported from a blade, and determine a standby blade of a first blade when receiving a fault alarm reported from the first blade; deliver a first configuration command to the storage system based on a mapping relationship between a startup card identification of the first blade and a first storage partition identification, wherein the first configuration command comprises information of a mapping relationship between a startup card identification of the determined standby blade and the first storage partition identification; and deliver a startup command to the determined standby blade.

10. A switching method, applicable to a management server, comprising:

determining a standby blade of a first blade when it is determined that the first blade is in abnormal operation;

delivering, based on an access relationship between a startup card of the first blade and a first storage partition, a first configuration command to a storage system, wherein the first configuration command comprises information of an access relationship between a startup card of the standby blade and the first storage partition, so that the storage system configures the access relationship between the startup card of the standby blade and the first storage partition; and delivering a startup command to the standby blade, so that the standby blade responds to the startup command, and after the startup card of the standby blade is started, loads, from the accessible first storage partition in the storage system, an operating system, an application program and configuration data, wherein the storage system comprises an active storage system and a standby storage system, and each storage system comprises multiple storage partitions; and the method further comprises:

removing an access relationship between a blade and a corresponding storage partition in the active storage system when it is determined that the active storage system is in abnormal operation, delivering a second configuration command to the standby storage system based on an access relationship between a startup card of the blade and the corresponding storage partition in the active storage system, wherein the second configuration command comprises information of an access relationship between the startup card of the blade and a corresponding storage partition in the standby storage system, and delivering a restart command to the blade.

11. The method according to claim 10, wherein the removing the access relationship between the blade and the corresponding storage partition in the active storage system when it is determined that the active storage system is in the abnormal operation, delivering the second configuration command to the standby storage system based on the access relationship between the startup card of the blade and the corresponding storage partition in the active storage system, the second configuration command comprising the information of the access relationship between the startup card of the blade and the corresponding storage partition in the standby storage system, and delivering the restart command to the blade, comprises:

monitoring a state of the active storage system, wherein the state comprises one or more combinations of a heartbeat of the storage system and a state of the storage system, removing a mapping relationship between a blade and the active storage system when detecting that any one of the combinations is abnormal, delivering a second configuration command to the standby storage system based on a mapping relationship between a startup card identification of the blade and a corresponding storage partition identification in the active storage system, wherein the second configuration command comprises information of a mapping relationship between the startup card identification of the blade and a corresponding storage partition identification in the standby storage system, and delivering a restart command to the blade.

12. The method according to claim 10, wherein the removing the access relationship between the blade and the corresponding storage partition in the active storage system when it is determined that the active storage system is in the abnormal operation, delivering the second configuration command to the standby storage system based on the access relationship between the startup card of the blade and the corresponding storage partition in the active storage system, the second configuration command comprising the information of the access relationship between the startup card of the blade and the corresponding storage partition in the standby storage system, and delivering the restart command to the blade, comprises:

monitoring a fault alarm reported from the storage system, removing a mapping relationship between a blade and the active storage system when receiving a fault alarm reported from the active storage system, delivering a second configuration command to the standby storage system based on a mapping relationship between a startup card identification of the blade and a corresponding storage partition identification in the active storage system, wherein the second configuration command comprising information of a mapping relationship between the startup card identification of the blade and a corresponding storage partition identification in the standby storage system, and delivering a restart command to the blade.

13. A switching method, applicable to a management server, comprising:

monitoring a fault alarm reported from a blade, and determining that the first blade is in abnormal operation when receiving a fault alarm reported from the first blade, determining a standby blade of the first blade when it is determined that the first blade is in abnormal operation;

delivering, based on an access relationship between a startup card of the first blade and a first storage partition, a first configuration command to a storage system, wherein the first configuration command comprises information of an access relationship between a startup card of the standby blade and the first storage partition, so that the storage system configures the access relationship between the startup card of the standby blade and the first storage partition; and delivering a startup command to the standby blade, so that the standby blade responds to the startup command, and after the startup card of the standby blade is started, loads, from the accessible first storage partition in the storage system, an operating system, an application program and configuration data.

* * * * *